(12) United States Patent
Endo

(10) Patent No.: US 11,765,283 B2
(45) Date of Patent: Sep. 19, 2023

(54) INFORMATION PROCESSING APPARATUS, IMAGE FORMING APPARATUS, AND IMAGE FORMING SYSTEM FOR TRANSMITTING ACCESS INFORMATION

(71) Applicant: FUJIFILM Business Innovation Corp., Tokyo (JP)

(72) Inventor: Yasuhiro Endo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/331,901

(22) Filed: May 27, 2021

(65) Prior Publication Data

US 2022/0182500 A1  Jun. 9, 2022

(30) Foreign Application Priority Data

Dec. 7, 2020  (JP) ................................ 2020-203011

(51) Int. Cl.
*H04N 1/00* (2006.01)
*H04N 1/44* (2006.01)

(52) U.S. Cl.
CPC ..... *H04N 1/00209* (2013.01); *H04N 1/00244* (2013.01); *H04N 1/4486* (2013.01); *H04N 2201/0015* (2013.01); *H04N 2201/0094* (2013.01)

(58) Field of Classification Search
CPC ........... H04N 1/00209; H04N 1/00244; H04N 1/4486; H04N 2201/0094; H04N 2201/0015
See application file for complete search history.

(56) References Cited

U.S. PATENT DOCUMENTS

| 9,817,621 B2 | 11/2017 | Ochi et al. | |
| 2004/0080781 A1* | 4/2004 | Okawa | H04N 1/32122 358/1.15 |
| 2004/0095600 A1* | 5/2004 | Nitta | H04N 1/32128 358/1.15 |
| 2006/0001908 A1* | 1/2006 | Ohta | G06F 3/1259 358/1.15 |
| 2006/0044590 A1* | 3/2006 | Ferlitsch | H04N 1/00087 358/1.14 |
| 2007/0279684 A1* | 12/2007 | Yoshihama | G11B 27/329 358/1.15 |
| 2012/0147420 A1* | 6/2012 | Nishimi | G06F 3/1204 358/1.15 |

(Continued)

FOREIGN PATENT DOCUMENTS

| JP | 2014-45311 A | 3/2014 |
| JP | 2018-185869 A | 11/2018 |

*Primary Examiner* — Nicholas Pachol
(74) *Attorney, Agent, or Firm* — Oliff PLC

(57) ABSTRACT

An information processing apparatus includes a processor configured to: when receiving an image forming instruction issued to an image forming apparatus, transmit image data and processing information to a server, the processing information including access information regarding access to the information processing apparatus and information for forming an image represented by the image data, and store the image data into the information processing apparatus; and perform control for transmitting the image data to the image forming apparatus in response to transmission of the image data being requested from the image forming apparatus.

16 Claims, 12 Drawing Sheets

(56) References Cited

U.S. PATENT DOCUMENTS

| | | | | |
|---|---|---|---|---|
| 2012/0314251 | A1* | 12/2012 | Yokoyama | G06F 3/1238 358/1.15 |
| 2014/0282996 | A1* | 9/2014 | Mori | H04L 63/0807 726/10 |
| 2014/0355039 | A1* | 12/2014 | Tsujimoto | G06F 3/1285 358/1.14 |
| 2015/0205548 | A1* | 7/2015 | Suzuki | G06F 3/1234 358/1.14 |
| 2016/0261769 | A1* | 9/2016 | Yamada | G06F 21/608 |
| 2016/0277631 | A1* | 9/2016 | Mori | G06F 3/1273 |
| 2016/0283176 | A1* | 9/2016 | Masuda | G06F 3/121 |
| 2017/0280005 | A1* | 9/2017 | Matsuda | H04N 1/00973 |
| 2018/0309881 | A1* | 10/2018 | Zakharov | H04N 1/32689 |
| 2019/0199863 | A1* | 6/2019 | Zakharov | H04N 1/00015 |
| 2020/0162621 | A1* | 5/2020 | Zakharov | H04N 1/00042 |
| 2020/0285427 | A1* | 9/2020 | Annamalai Thangaraj | G06F 3/167 |
| 2020/0336609 | A1* | 10/2020 | Horie | G06F 3/1207 |
| 2021/0232353 | A1* | 7/2021 | Lee | G06F 3/128 |

* cited by examiner

FIG. 6

| SETTINGS | — □ × |
|---|---|

PATTERN SETTING ○ ONLY A ○ ONLY B ◉ A→B ○ B→A

\* A→B IF PATTERN A FAILS TO BE EXECUTED, PATTERN B IS EXECUTED
\* B→A IF PATTERN B FAILS TO BE EXECUTED, PATTERN A IS EXECUTED

SERVER ADDRESS: https://printservice.exanpl

MF MACHINE ADDRESS: http://192.168.0.1/jpp

NETWORK INTERFACE NAME: ETHERNET ∨

TIME-OUT VALUE: 3000 MILLISECONDS

[ENTER] [CANCEL]

INFORMATION PROCESSING APPARATUS, IMAGE FORMING APPARATUS, AND IMAGE FORMING SYSTEM FOR TRANSMITTING ACCESS INFORMATION

CROSS-REFERENCE TO RELATED APPLICATIONS

This application is based on and claims priority under 35 USC 119 from Japanese Patent Application No. 2020-203011 filed Dec. 7, 2020.

BACKGROUND

(i) Technical Field

The present disclosure relates to an information processing apparatus, an image forming apparatus, and an image forming system.

(ii) Related Art

An image forming method is suggested in Japanese Unexamined Patent Application Publication No. 2018-185869. In the image forming method, in a case where, in the process of image formation based on image formation data acquired from an information processing apparatus, a state of an image formation relation unit relating to image formation becomes error and there is image formation data acquired from a server from which image formation is to be performed after the image formation data acquired from the information processing apparatus, state information regarding the state of the image formation relation unit is notified to the server.

An image forming apparatus is suggested in Japanese Unexamined Patent Application Publication No. 2014-045311. After a user account of a cloud service system is logged in, the image forming apparatus uploads image data in association with an ID to a storage service. Once the upload communication for the image data is completed, the image forming apparatus searches the storage service for the image data using the ID as a key, and verifies that the image data is registered in the storage service. In the case where the image data fails to be registered, the image forming apparatus re-uploads the image data.

SUMMARY

In image formation via a server, a file is downloaded from the server. Therefore, such image formation tends to take a long time compared to image formation via direct connection to an image forming apparatus. However, for example, in the case where direct connection to an image formation apparatus is not able to be established, image formation needs to be performed via a server. It would be troublesome for users to select where to transmit image data, that is, select whether image data is to be stored in the server to form an image or directly transmitted to the image forming apparatus to form an image, every time that image formation needs to be performed.

Aspects of non-limiting embodiments of the present disclosure relate to an information processing apparatus, an image forming apparatus, and an image forming system that are capable of performing image formation without selecting whether image data is to be transmitted to a server or to the image forming apparatus every time that image formation needs to be performed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: when receiving an image forming instruction issued to an image forming apparatus, transmit image data and processing information to a server, the processing information including access information regarding access to the information processing apparatus and information for forming an image represented by the image data, and store the image data into the information processing apparatus; and perform control for transmitting the image data to the image forming apparatus in response to transmission of the image data being requested from the image forming apparatus.

BRIEF DESCRIPTION OF THE DRAWINGS

Exemplary embodiments of the present disclosure will be described in detail based on the following figures, wherein:

FIG. 6 is a diagram illustrating an example of a setting screen displayed on an information processing apparatus;

DETAILED DESCRIPTION

Figure 1:
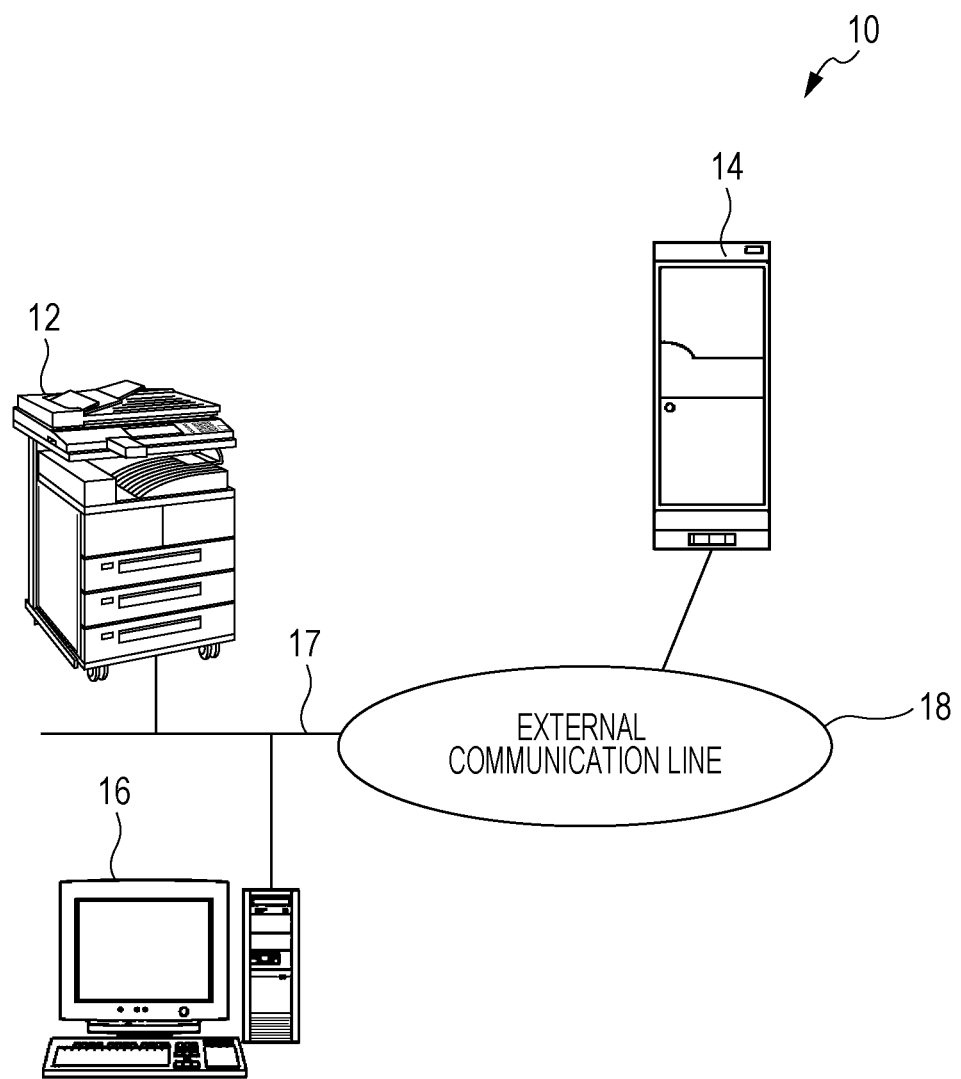
FIG. 1 is a diagram illustrating a schematic configuration of an image forming system according to an exemplary embodiment.

Hereinafter, an exemplary embodiment of the present disclosure will be described in detail with reference to drawings. FIG. 1 is a diagram illustrating a schematic configuration of an image forming system according to an exemplary embodiment.

An image forming system 10 according to an exemplary embodiment includes, as illustrated in FIG. 1, an image forming apparatus 12, a cloud server 14, and an information processing apparatus 16. In this exemplary embodiment, only an image forming apparatus 12, a cloud server 14, and an information processing apparatus 16 are provided. However, a plurality of image forming apparatuses 12, a plurality of cloud servers 14, and a plurality of information processing apparatuses 16 may be provided. Furthermore, the information processing apparatus 16 may be a personal computer or a portable terminal such as a tablet terminal or a smartphone.

The image forming apparatus 12 and the information processing apparatus 16 are connected to an internal communication line 17 such as a local area network (LAN) or an intranet. The internal communication line 17 and the cloud server 14 are connected to an external communication line 18 such as a wide area network (WAN) or the Internet. The image forming apparatus 12, the cloud server 14, and the information processing apparatus 16 are able to perform transmission and reception of various data to and from one another via the internal communication line 17 and the external communication line 18.

Figure 2:
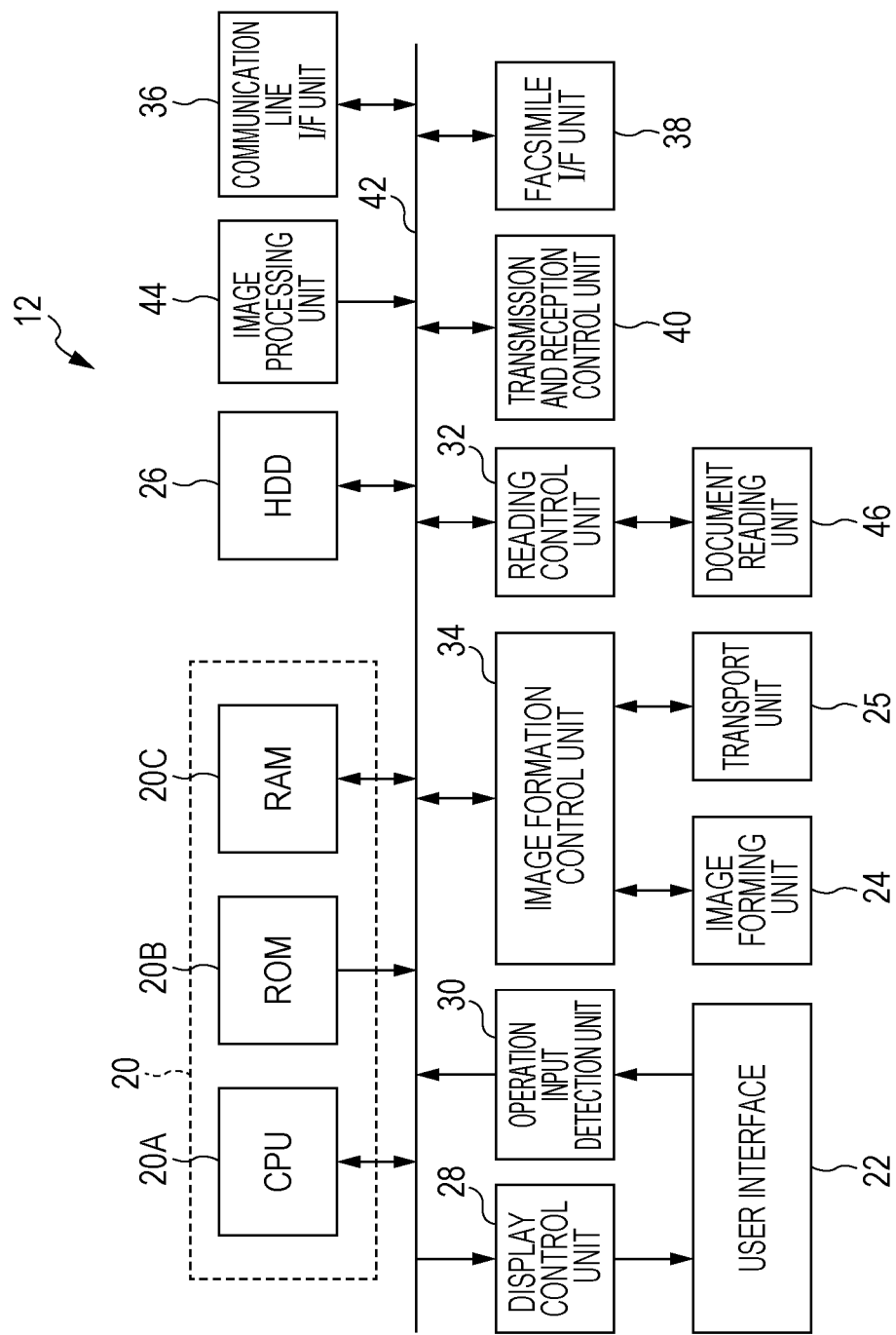
FIG. 2 is a block diagram illustrating a configuration of a principal part of an electrical system of an image forming apparatus according to an exemplary embodiment.

FIG. 2 is a block diagram illustrating a configuration of a principal part of an electrical system of the image forming apparatus 12 according to an exemplary embodiment.

The image forming apparatus 12 according to this exemplary embodiment includes, as illustrated in FIG. 2, a control unit 20 including a central processing unit (CPU) 20A, a read only memory (ROM) 20B, and a random access memory (RAM) 20C. The CPU 20A manages the overall operation of the image forming apparatus 12. The RAM 20C is used as a work area or the like when various programs are executed by the CPU 20A. Various control programs, various parameters, and the like are stored in advance in the ROM 20B. In the image forming apparatus 12, components of the control unit 20 are electrically connected to one another by a system bus 42.

In addition, the image forming apparatus 12 according to this exemplary embodiment includes a hard disk drive (HDD) 26 in which various data, application programs, and the like are stored. The image forming apparatus 12 also includes a display control unit 28 that is connected to a user interface 22 and controls display of various operation screens and the like on a display of the user interface 22. The image forming apparatus 12 also includes an operation input detection unit 30 that is connected to the user interface 22 and detects an operation instruction input via the user interface 22. In the image forming apparatus 12, the HDD 26, the display control unit 28, and the operation input detection unit 30 are electrically connected to the system bus 42. An example of the image forming apparatus 12 according to this exemplary embodiment that includes the HDD 26 will be described below. However, the image forming apparatus 12 does not necessarily include the HDD 26 and may include a non-volatile storing unit such as a flash memory.

Furthermore, the image forming apparatus 12 according to this exemplary embodiment includes a reading control unit 32 that controls an optical image reading operation by a document reading unit 46 and a document feeding operation by a document transport unit and an image formation control unit 34 that controls image formation processing by an image forming unit 24 and transport of paper to the image forming unit 24 by a transport unit 25. The image forming apparatus 12 also includes a communication line interface (communication line I/F) unit 36 that is connected to the internal communication line 17 and performs transmission and reception of communication data to and from other external apparatuses such as the cloud server 14 connected to the internal communication line 17 and an image processing unit 44 that performs various types of image processing. The image forming apparatus 12 further includes a facsimile interface (facsimile I/F) unit 38 that is connected to a telephone line, which is not illustrated in drawings, and performs transmission and reception of facsimile data to and from a facsimile apparatus connected to the telephone line. The image forming apparatus 12 also includes a transmission and reception control unit 40 that controls transmission and reception of facsimile data via the facsimile I/F unit 38. In the image forming apparatus 12, the transmission and reception control unit 40, the reading control unit 32, the image formation control unit 34, the communication line I/F unit 36, the facsimile I/F unit 38, and the image processing unit 44 are electrically connected the system bus 42.

With the configuration described above, in the image forming apparatus 12 according to this exemplary embodiment, the CPU 20A accesses the RAM 20C, the ROM 20B, and the HDD 26. Furthermore, in the image forming apparatus 12, the CPU 20A causes the display control unit 28 to control display of an operation screen and information such as various messages on the display of the user interface 22. In the image forming apparatus 12, the CPU 20A causes the reading control unit 32 to control operations of the document reading unit 46 and the document transport unit. In the image forming apparatus 12, the CPU 20A causes the image formation control unit 34 to control operations of the image forming unit 24 and the transport unit 25 and causes the communication line I/F unit 36 to control transmission and reception of communication data. In the image forming apparatus 12, the CPU 20A causes the transmission and reception control unit 40 to control transmission and reception of facsimile data by the facsimile I/F unit 38. Furthermore, in the image forming apparatus 12, the CPU 20A understands content of an operation using the user interface 22 on the basis of operation information detected by the operation input detection unit 30 and performs various types of control based on the content of the operation.

Figure 3:
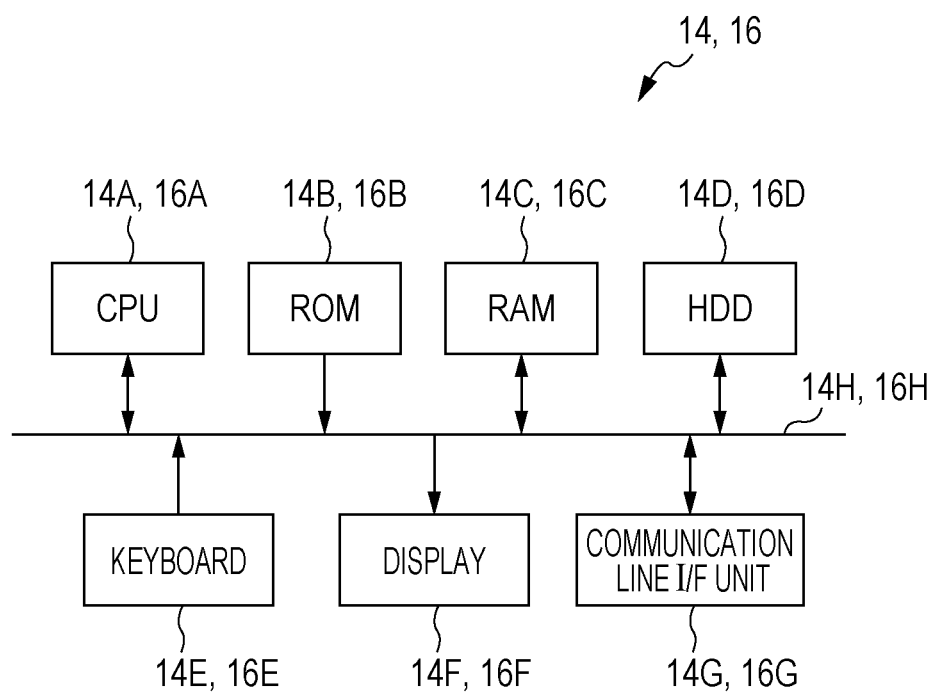
FIG. 3 is a block diagram illustrating a configuration of a principal part of an electrical system of a cloud server and an information processing apparatus according to an exemplary embodiment.

Now, a configuration of a principal part of an electrical system of the cloud server 14 and the information processing apparatus 16 in this exemplary embodiment will be described. FIG. 3 is a block diagram illustrating a configuration of a principal part of an electrical system of the cloud server 14 and the information processing apparatus 16 in this exemplary embodiment. Basically, the cloud server 14 and the information processing apparatus 16 each have a configuration of a typical computer. Thus, a configuration of a principal part of the electrical system of the cloud server 14 will be described as a representative. Explanation for a configuration of a principal part of the electrical system of the information processing apparatus 16 will be omitted, and only corresponding reference signs are indicated in FIG. 3.

The cloud server 14 in this exemplary embodiment includes, as illustrated in FIG. 3, a CPU 14A, a ROM 14B, a RAM 14C, an HDD 14D, a keyboard 14E, a display 14F, and a communication interface (I/F) unit 14G. The CPU 14A manages the overall operation of the cloud server 14. Various control programs, various parameters, and the like are stored in advance in the ROM 14B. The RAM 14C is used as a work area or the like when various programs are executed by the CPU 14A. Various data, application programs, and the like are stored in the HDD 14D. The keyboard 14E is used to input various types of information. The display 14F is used to display various types of information. The communication line I/F unit 14G is connected to the external communication line 18 and performs transmission and reception of various data to and from other apparatuses connected to the external communication line 18. The components of the cloud server 14 described above are electrically connected to one another by a system bus 14H. An example of the cloud server 14 in this exemplary embodiment that includes the HDD 14D will be described below. However, the cloud server 14 does not necessarily include the HDD 14D and may include a non-volatile storing unit such as a flash memory. A communication line interface (I/F) unit 16G of the information processing apparatus 16 is connected to the internal communication line 17 and performs transmission and reception of various data to and from other apparatuses connected to the internal communication line 17.

With the configuration described above, in the cloud server 14 in this exemplary embodiment, the CPU 14A accesses the ROM 14B, the RAM 14C, and the HDD 14D, acquires various data using the keyboard 14E, and displays various types of information on the display 14F. Furthermore, in the cloud server 14, the CPU 14A controls transmission and reception of communication data via the communication line I/F unit 14G.

Figure 4:
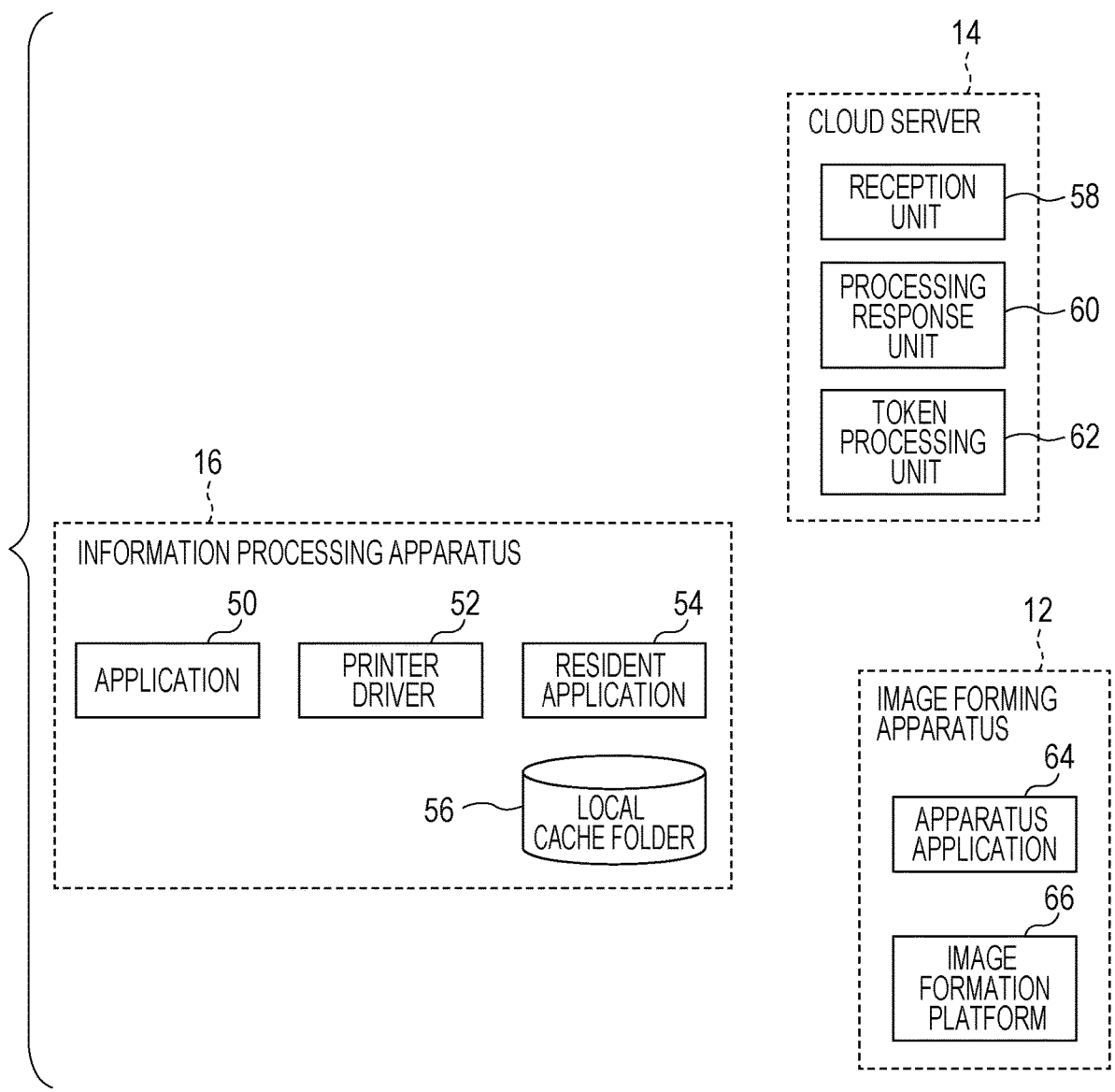
FIG. 4 is a functional block diagram illustrating a functional configuration of units of an image forming system according to an exemplary embodiment.

Next, a functional configuration of apparatuses forming the image forming system 10 according to this exemplary embodiment configured as described above will be described. FIG. 4 is a functional block diagram illustrating a functional configuration of each of the apparatuses forming the image forming system 10 according to this exemplary embodiment.

The information processing apparatus 16 includes functions of an application 50, a printer driver 52, and a resident application 54.

The application 50 includes various applications having a printing function running on the information processing apparatus 16.

The printer driver 52 performs processing for creating print data as image data in accordance with an instruction from the application 50 and passing the print data to the resident application 54.

The resident application 54 receives print data from the printer driver 52 and responds to a print data acquisition request from an apparatus application 64 of the image forming apparatus 12. The resident application 54 also performs processing for storing print data into a local cache folder 56. The resident application 54 encrypts print data and stores the encrypted print data into the local cache folder 56 so that security of the print data is ensured. However, simplified processing in which non-encrypted print data is stored may be performed. Alternatively, setting as to whether or not to encrypt print data may be performed.

The cloud server 14 includes functions of a reception unit 58, a processing response unit 60, and a token processing unit 62.

The reception unit 58 receives from the resident application 54 processing information indicating content of processing, such as printing settings, and print data. The processing information includes setting conditions for printing, such as the number of copies to be printed, image quality, color/monochrome, and a document name. The document name may be the original file name or the title of a webpage. The document name varies depending on the application that performs printing. Furthermore, in this exemplary embodiment, the processing information further includes access information such as an internet protocol (IP) address. However, the processing information may be separated from the access information.

The processing response unit 60 responds to various requests such as a processing list acquisition request from the apparatus application 64 of the image forming apparatus 12.

The token processing unit 62 issues a token in accordance with a request for issuing a token, and verifies the token in accordance with a request for verifying a token.

The image forming apparatus 12 includes functions of the apparatus application 64 and an image formation platform 66.

The apparatus application 64 includes a function for performing processing for displaying a screen for a processing list and the like on the user interface 22 and processing regarding a token and a function for passing print data acquired from the cloud server 14 or the resident application 54 to the image formation platform 66.

The apparatus application 64 provides a basic function as the image forming apparatus 12, such as display on the user interface 22 and image formation based on print data. For example, the image formation platform 66 includes an application programming interface (API).

Figure 5:
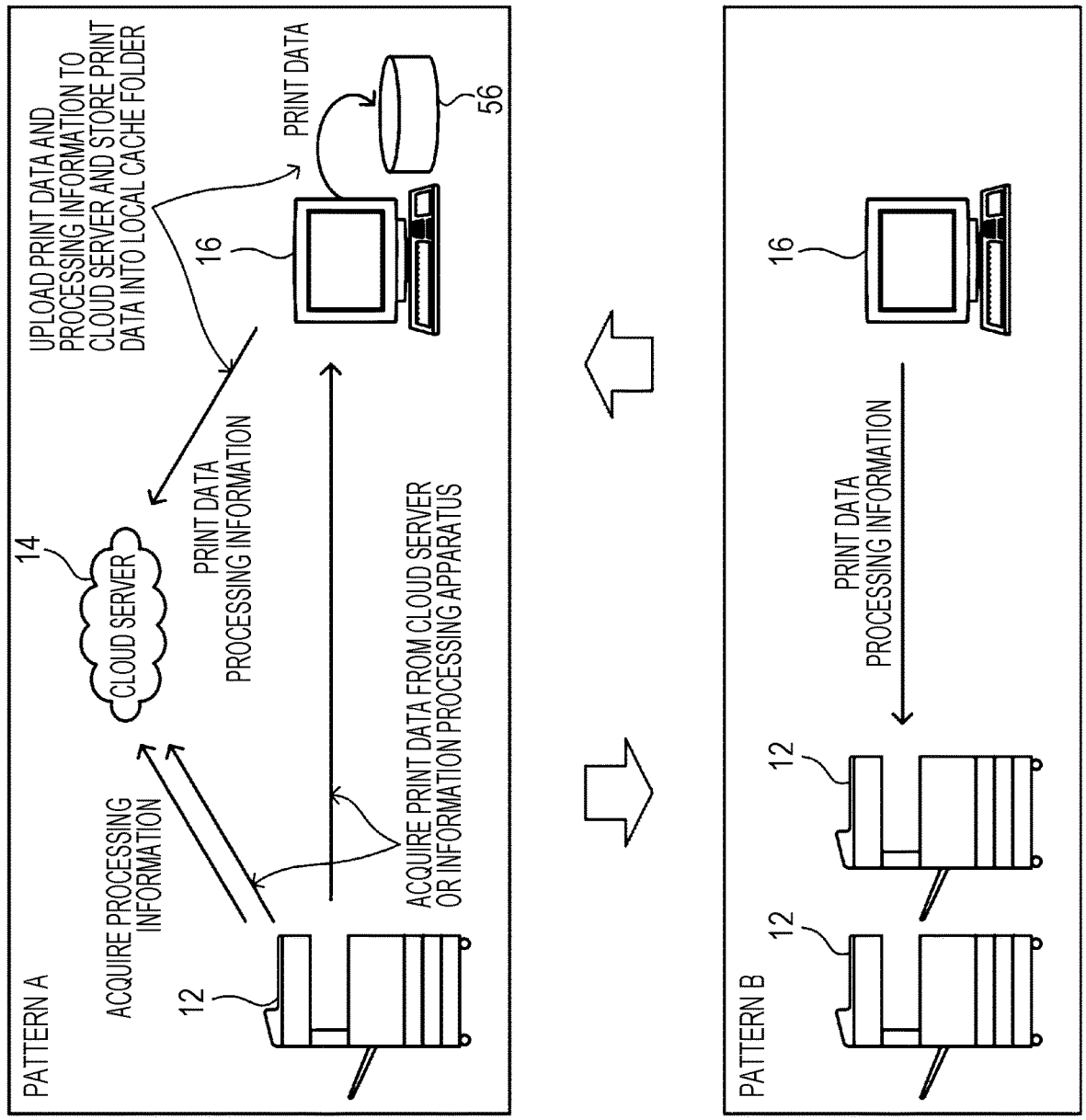
FIG. 5 is a diagram for explaining an example of processing patterns based on which printing is performed by an image forming apparatus in an image forming system according to an exemplary embodiment.

Next, processing patterns based on which printing is performed by the image forming apparatus 12 in the image forming system 10 according to this exemplary embodiment will be described. FIG. 5 is a diagram for explaining examples of processing patterns based on which printing is performed by the image forming apparatus 12 in the image forming system 10 according to this exemplary embodiment.

In the image forming system 10 according to this exemplary embodiment, the image forming apparatus 12 is capable of printing in accordance with two types of processing patterns, that is, pattern A as a first pattern and pattern B as a second pattern.

In this exemplary embodiment, printing is performed in accordance with the pattern A in the case where the information processing apparatus 16 is able to be connected to the cloud server 14, and printing is performed in accordance with the pattern B in the case where the information processing apparatus 16 is not able to be connected to the cloud server 14.

In the pattern A, the information processing apparatus 16 transmits to the cloud server 14 print data and processing information including access information of the information processing apparatus 16 and information for forming an image represented by the print data, and stores the print data into the local cache folder 56 of the information processing apparatus 16. In printing at the image forming apparatus 12, the image forming apparatus 12 acquires the processing information from the cloud server 14, and acquires the print data from the cloud server 14 or the information processing apparatus 16 to perform printing. Uploading the processing information and the print data to the cloud server 14 and storing the print data into the information processing apparatus 16 are not necessarily performed at the same time. For example, after uploading the processing information and the print data to the cloud server 14, the print data may be stored into the information processing apparatus 16. In this exemplary embodiment, it is assumed that the processing information and the print data are uploaded to the cloud server 14 from the information processing apparatus 16 in accordance with an operation on the information processing apparatus 16 by a user, and after the print data is stored into the information processing apparatus 16, the user moves to the front of the image forming apparatus 12 and performs an operation on the user interface 22, so that printing is performed.

In the pattern B, the processing information and the print data are directly transmitted from the information processing apparatus 16 to the image forming apparatus 12, and the image forming apparatus 12, to which the processing information and the print data are transmitted, performs printing. Alternatively, printing may be performed using an available image forming apparatus 12 on a network by using a serverless on-demand print (SODP) service in which printing processing transmitted to an image forming apparatus 12 is allowed to be output from another image forming apparatus 12, out of preset image forming apparatuses 12. Furthermore, in the case where the processing information and the print data are directly transmitted to the image forming apparatus 12 from the information processing apparatus 16 in accordance with the pattern B, short range communication (for example, Wi-Fi® or Bluetooth®) may be used.

At the time of uploading the processing information and the print data to the cloud server 14 from the information processing apparatus 16, the timing when the processing information and the print data on the cloud server 14 will be deleted may be selected. For example, a selection may be made among confirming deletion of the processing information and the print data at the time of image formation, not deleting the processing information and the print data, and deleting the processing information and the print data after a predetermined time (for example, fifteen minutes) has passed. Furthermore, a time limit by which print data is to be deleted may be selected for each contract unit such as a tenant. For example, a selection may be made in units of contracts, ranging from an hour to seven days.

Furthermore, the print data stored in the information processing apparatus 16 may be deleted at the time different from the time at which the print data transmitted to the cloud server 14 is deleted. This is because the print data on the information processing apparatus 16 is merely a cache and may be deleted at a time earlier than the time at which the print data on the cloud server 14 is deleted. For example, the print data may be deleted by a predetermined operation of the information processing apparatus 16. Specifically, all the print data may be deleted, as a predetermined operation, at the time when the application 50, which manages the print data on the information processing apparatus 16, ends or starts. Accordingly, as a result, all the print data are deleted at the time of logging out, logging in, and restart. Besides them, the print data on the information processing apparatus 16 may be deleted when a predetermined time (for example, five minutes) has passed.

Furthermore, in this exemplary embodiment, a processing patter used when the image forming apparatus 12 performs printing may be set on a setting screen on the information processing apparatus 16. FIG. 6 is a diagram illustrating an example of a setting screen displayed on the information processing apparatus 16.

In the example of FIG. 6, as pattern setting, selection may be made from among four types: only pattern A ("only A" in FIG. 6); only pattern B ("only B" in FIG. 6); pattern B if pattern A fails ("A→B" in FIG. 6); and pattern A if pattern B fails ("B→A" in FIG. 6). In FIG. 6, an example in which "A→B" is selected is illustrated.

Furthermore, on the setting screen illustrated in FIG. 6, the address of the cloud server 14 (server address in FIG. 6), the address of the image forming apparatus 12 (MF machine address in FIG. 6), and a network interface name may be set.

Furthermore, a time-out value for determining whether a processing pattern has failed may be set. When a time set as the time-out value has passed, it is determined that printing has failed.

The server address, the MF machine address, the network interface name, and the time-out value in FIG. 6 may be displayed in the case where an administrator performs an operation and may be non-displayed normally.

Next, the procedure of a specific process performed in the image forming system 10 according to this exemplary embodiment configured as described above will be described.

Figure 7:
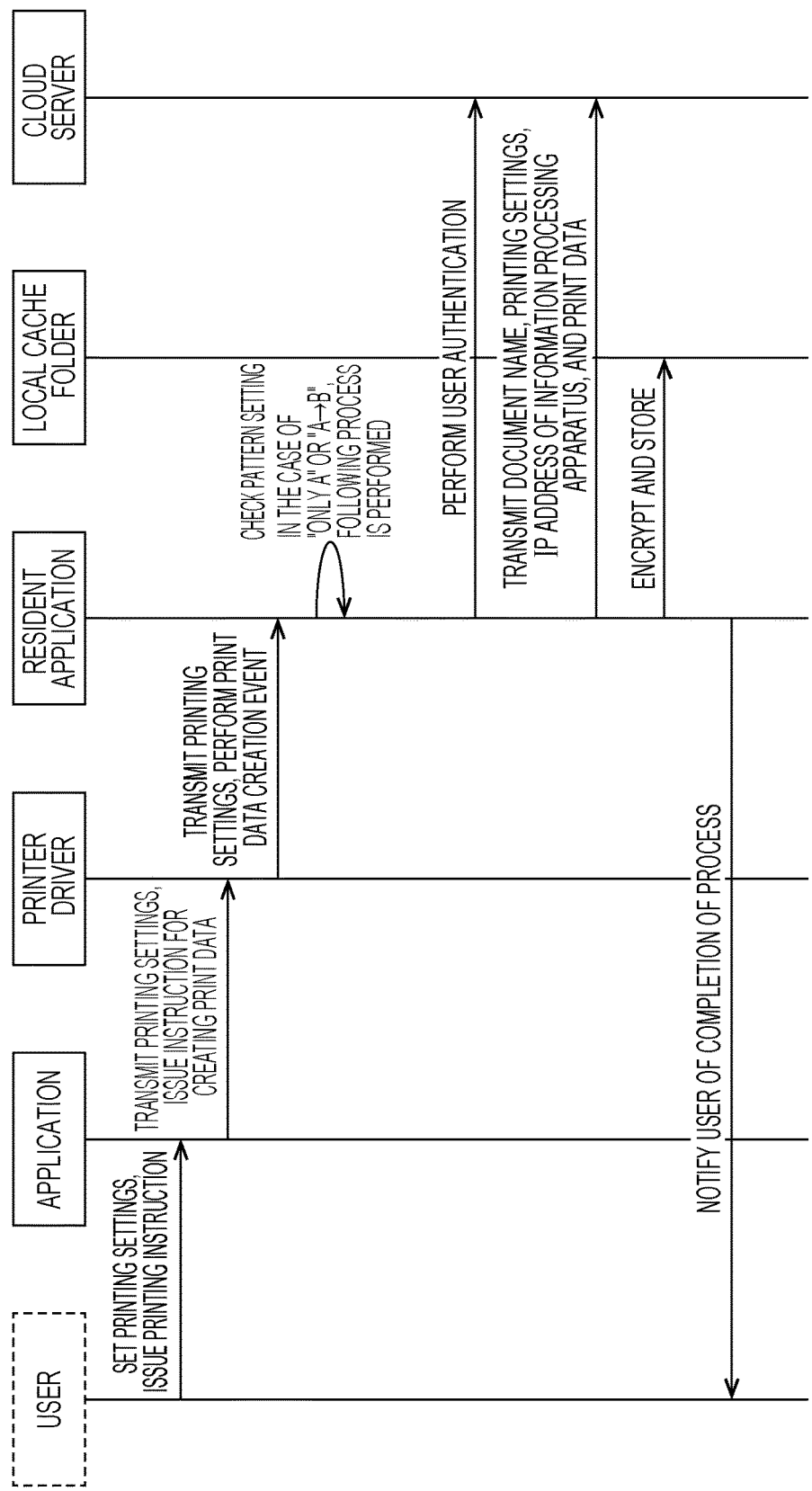
FIG. 7 is a sequence diagram illustrating an example of the procedure of a process for uploading print data to a cloud server in the case where printing is performed in accordance with pattern A in an image forming system according to an exemplary embodiment.

First, the procedure of a process for uploading print data to the cloud server 14 in the case where printing is performed in accordance with the pattern A will be described. FIG. 7 is a sequence diagram illustrating an example of the procedure of a process for uploading print data to the cloud server 14 in the case where printing is performed in accordance with the pattern A in the image forming system 10 according to this exemplary embodiment.

When a user operates the information processing apparatus 16 to set printing settings on the application 50 and issue a printing instruction, the application 50 transmits the set printing settings to the printer driver 52 to issue an instruction for creating print data.

The printer driver 52 transmits the printing settings to the resident application 54 in response to the instruction for creating print data from the application, and executes a print data creation event for creating print data.

The resident application 54 checks pattern setting from the printing settings transmitted from the printer driver 52. The resident application 54 performs a process described below in the case where the setting is such that only the pattern A is executed or the pattern B is executed if the pattern A is not able to be executed.

That is, the resident application 54 performs user authentication for the cloud server 14. In the case where authentication is successful, the resident application 54 transmits processing information including a document name, printing settings, and the IP address of the information processing apparatus 16 as access information of access to the information processing apparatus 16 and print data to the cloud server 14. Furthermore, the resident application 54 encrypts the print data, stores the encrypted print data into the local cache folder 56 of the information processing apparatus 16, and notifies the user of completion of the process. After the processing information is transmitted to the cloud server 14, the processing information is completely deleted or partially deleted. For example, a document ID is not deleted and remains in the information processing apparatus 16 as part of the processing information.

Next, the procedure of a process for a case where the image forming apparatus 12 performs printing in accordance with the pattern A after processing information and print data are uploaded to the cloud server 14 will be described.

Figure 8:
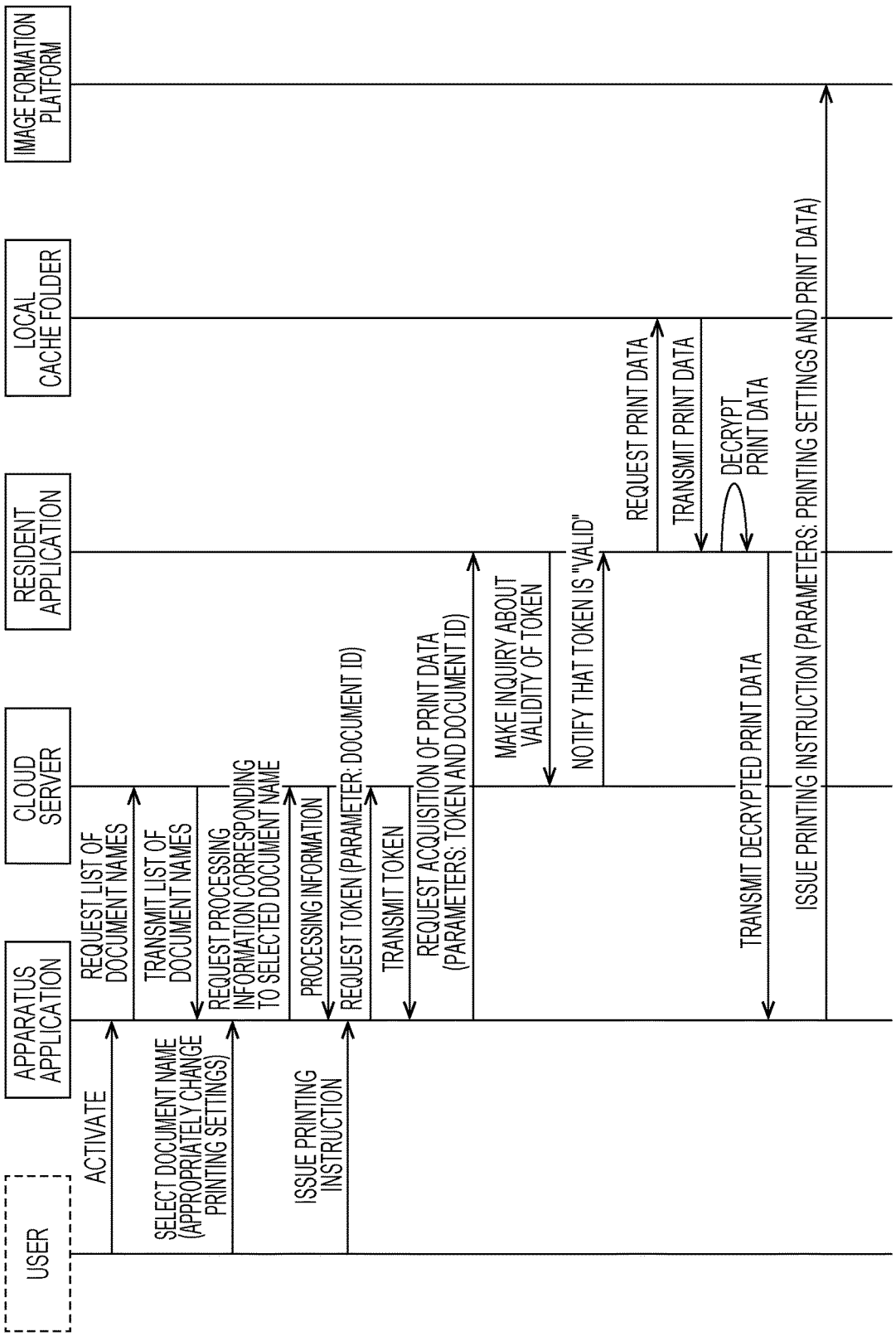
FIG. 8 is a sequence diagram illustrating an example of the procedure of a process for a case where, after processing information and print data are uploaded to a cloud server, an image forming apparatus acquires the processing information from the cloud server and acquires the print data from an information processing apparatus in accordance with the pattern A in an image forming system according to an exemplary embodiment.

First, a case where the image forming apparatus 12 acquires processing information from the cloud server 14 and acquires print data from the information processing apparatus 16 in accordance with the pattern A will be described. FIG. 8 is a sequence diagram illustrating an example of the procedure of a process for a case where, after processing information and print data are uploaded to the cloud server 14, the image forming apparatus 12 acquires the processing information from the cloud server 14 and acquires the print data from the information processing apparatus 16 in accordance with the pattern A in the image forming system 10 according to this exemplary embodiment.

When a user moves to the front of the image forming apparatus 12 and operates the user interface 22 to activate the apparatus application 64, the apparatus application 64 requests the cloud server 14 for the list of document names.

In the cloud server 14, the processing response unit 60 transmits the list of document names in response to the request for the list of document names.

When the user operates the user interface 22 to select a document name, the apparatus application 64 requests the cloud server 14 for processing information corresponding to the selected document name. In selecting a document name, printing settings may be changed appropriately.

In the cloud server 14, the reception unit 58 receives the request for the processing information from the apparatus application 64, and the processing response unit 60 transmits the processing information corresponding to the document name to the apparatus application 64.

When the user operates the user interface 22 to issue an instruction for starting printing, the apparatus application 64 requests the cloud server 14 for a token. The apparatus application 64 requests a token by using a document ID as a parameter.

In the cloud server 14, the reception unit 58 receives the request for a token using the document ID from the apparatus application 64 as a parameter, and the token processing unit 62 issues a token using the document ID as a parameter and transmits the token to the apparatus application 64.

The apparatus application 64 requests the resident application 54 for acquisition of print data by using the token and the document ID as parameters. At this time, the apparatus application 64 specifies the IP address of the information processing apparatus 16 as part of the processing information and performs communication. In the case where connection is able to be established using the specified IP address, a process described below is performed.

The resident application 54 receives the request for acquisition of the print data from the apparatus application 64, and makes an inquiry to the cloud server 14 about the validity of the token. That is, the resident application 54 checks whether the image forming apparatus 12, which has issued the request, has an access right to the specified document.

In the cloud server 14, the token processing unit 62 checks the validity of the token. In the case where the token is valid, the cloud server 14 notifies the resident application 54 of information indicating that the token is valid.

In the case where the token is valid, the resident application 54 requests acquisition of the print data stored in the local cache folder 56.

The local cache folder 56 transmits the corresponding print data to the resident application 54.

The resident application 54 acquires the print data from the local cache folder 56, decrypts the encrypted print data, and transmits the decrypted print data to the apparatus application 64.

The apparatus application 64 issues a printing instruction to the image formation platform 66. In this case, a printing instruction is issued using printing settings and print data as parameters. Accordingly, the image formation platform 66 forms an image based on the printing settings and the print data, and printing is thus performed.

Figure 9:
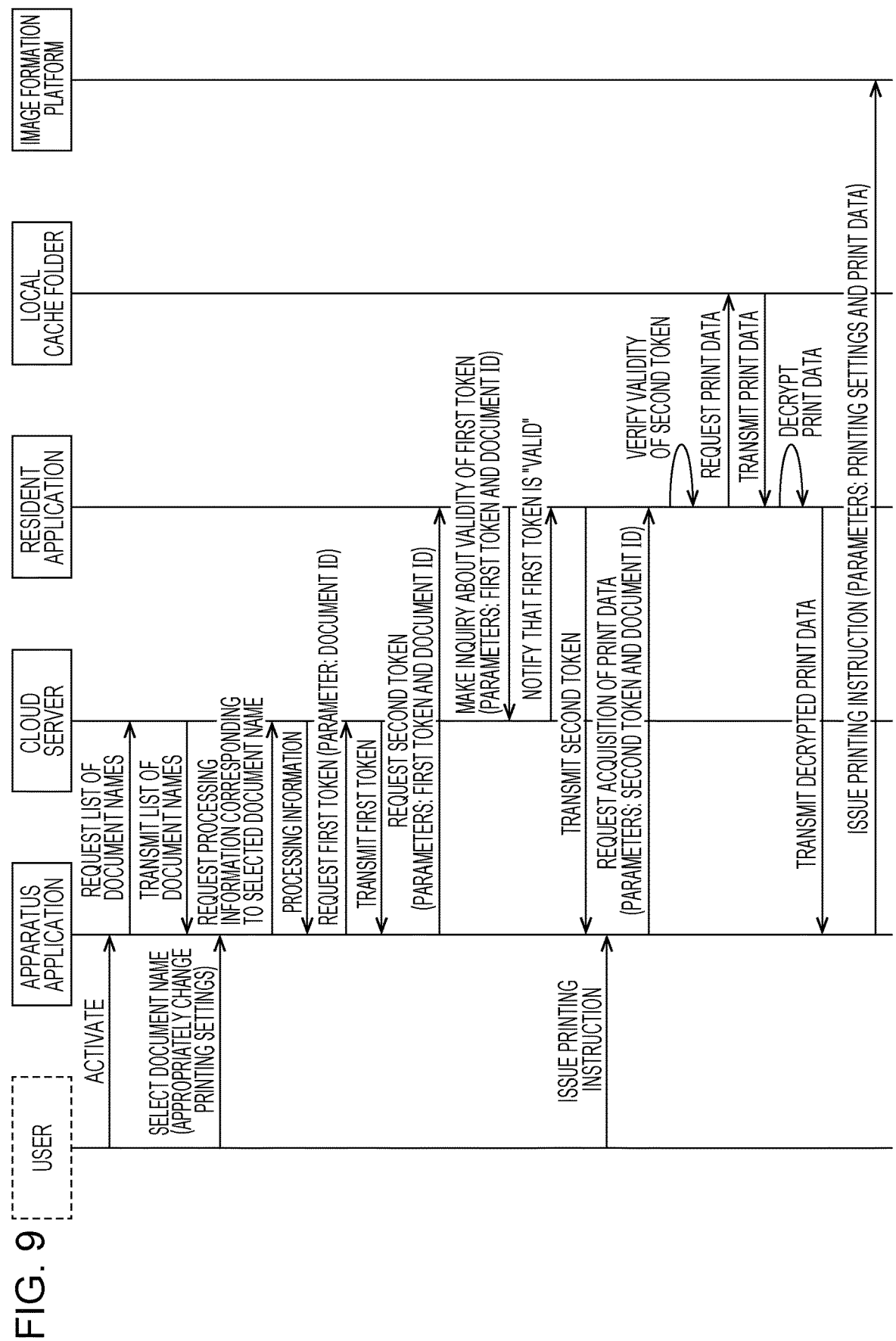
FIG. 9 is a sequence diagram illustrating a modification of a process for a case where, after processing information and print data are uploaded to a cloud server, an image forming apparatus acquires the processing information from the cloud server and acquires the print data from an information processing apparatus in accordance with the pattern A in an image forming system according to an exemplary embodiment.

Next, a modification of the process for a case where the image forming apparatus 12 performs printing in accordance with the pattern A after processing information and print data are uploaded to the cloud server 14 described above will be described. FIG. 9 is a sequence diagram illustrating a modification of a process for a case where, after processing information and print data are uploaded to the cloud server 14, the image forming apparatus 12 acquires processing information from the cloud server 14 and acquires print data from the information processing apparatus 16 in accordance with the pattern A in the image forming system 10 according to this exemplary embodiment.

When a user moves to the front of the image forming apparatus 12 and operates the user interface 22 to activate the apparatus application 64, the apparatus application 64 requests the cloud server 14 for the list of document names.

In the cloud server 14, the processing response unit 60 transmits the list of document names in response to the request for the list of document names from the apparatus application 64.

When the user operates the user interface 22 to select a document name, the apparatus application 64 requests the cloud server 14 for processing information corresponding to the selected document name. In selecting a document name, printing settings may be changed appropriately.

In the cloud server 14, the reception unit 58 receives the request for the processing information from the apparatus application 64, and the processing response unit 60 transmits the processing information corresponding to the document name to the apparatus application 64.

The apparatus application 64 receives the processing information from the cloud server 14, and requests the cloud server 14 for a first token. The apparatus application 64 requests the first token by using a document ID as a parameter.

In the cloud server 14, the reception unit 58 receives the request for the first token from the apparatus application 64, and the token processing unit 62 issues the first token and transmits the first token to the apparatus application 64.

The apparatus application 64 receives the first token from the cloud server 14, and requests the resident application 54 for a second token. The apparatus application 64 requests the second token by using the first token and the document ID as parameters.

The resident application 54 receives the request for the second token from the apparatus application 64, and makes an inquiry to the cloud server 14 about the validity of the first token. The resident application 54 makes the inquiry about the validity of the first token by using the first token and the document ID as parameters.

In the cloud server 14, the token processing unit 62 verifies the validity of the first token in accordance with the first token and the document ID. In the case where the first token is valid, the cloud server 14 notifies the resident application 54 of information indicating that the first token is valid.

In the case where the first token is valid, the resident application 54 issues the second token and transmits the second token to the apparatus application 64. That is, in the modification in FIG. 9, verification of the first token issued by the cloud server 14 may take time because access to the cloud server 14 is needed. Thus, verification of the first token is completed before issuance of a printing instruction and the resident application 54 performs conversion to the second token, which is managed by the resident application 54.

When receiving the second token, the apparatus application 64 receives a printing instruction from the user, and issues to the resident application 54 a request for acquisition of the print data. The apparatus application 64 issues the request for acquisition of the print data by using the second token and the document ID as parameters.

The resident application 54 receives the request for acquisition of the print data from the apparatus application 64, and verifies the validity of the second token. The second token is managed within the resident application 54, and the resident application 54 is thus able to verify the validity of the second token.

In the case where the second token is valid, the resident application 54 requests the local cache folder 56 for the print data.

The local cache folder 56 transmits the corresponding print data to the resident application 54 in response to the request for the print data from the resident application 54.

The resident application 54 acquires the print data from the local cache folder 56, decrypts the encrypted print data, and transmits the decrypted print data to the apparatus application 64.

The apparatus application 64 issues a printing instruction to the image formation platform 66. The apparatus application 64 issues the printing instruction by using printing settings and print data as parameters. Accordingly, the image formation platform 66 forms an image based on the printing settings and the print data, and printing is thus performed.

Figure 10:
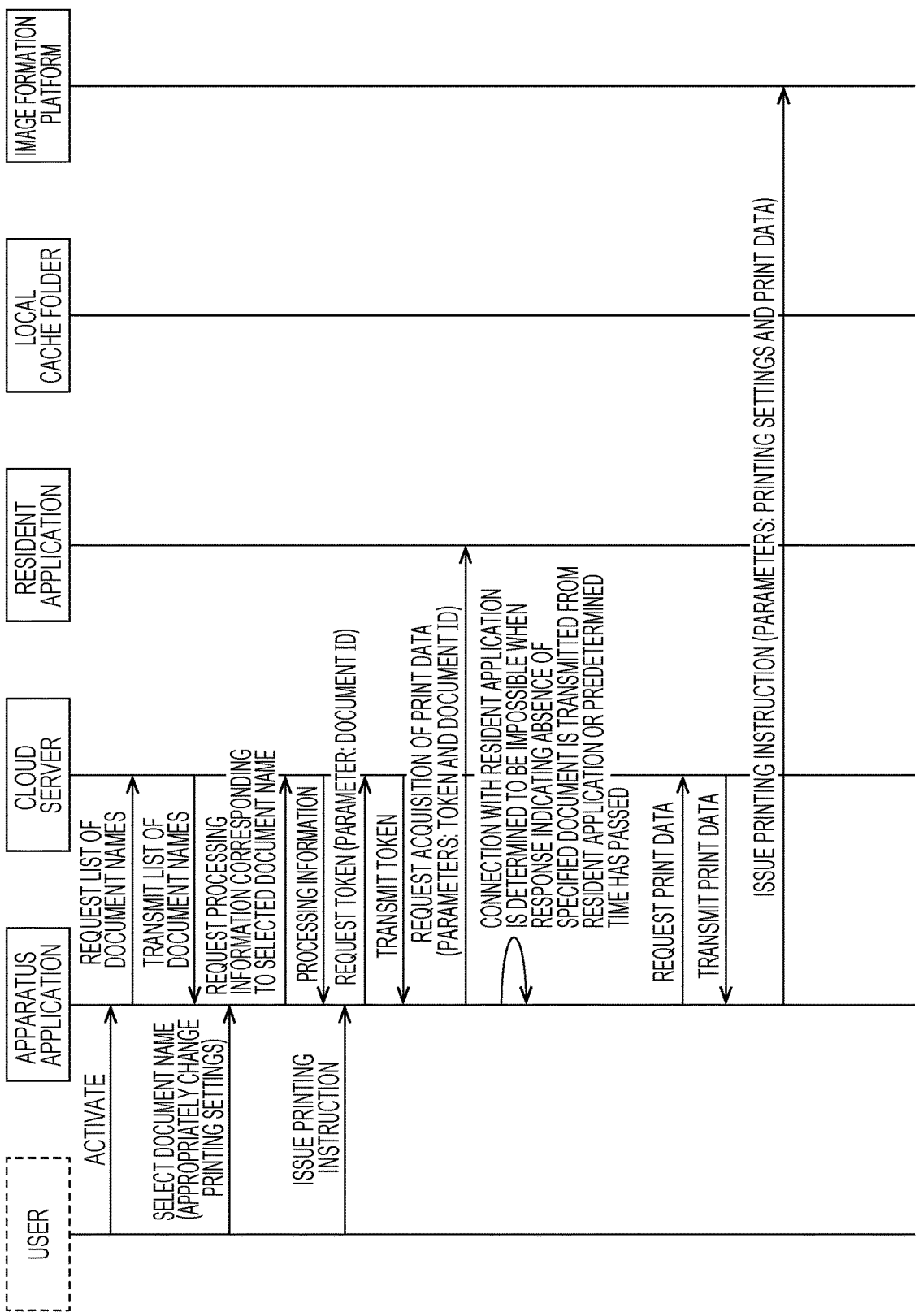
FIG. 10 is a sequence diagram illustrating an example of the procedure of a process for a case where, after processing information and print data are uploaded to a cloud server, an image forming apparatus acquires the processing information and the print data from the cloud server in accordance with the pattern A in an image forming system according to an exemplary embodiment.

Next, a case where the image forming apparatus 12 acquires processing information and print data from the cloud server 14 in accordance with the pattern A will be described. FIG. 10 is a sequence diagram illustrating an example of the procedure of a process for a case where, after processing information and print data are uploaded to the cloud server 14, the image forming apparatus 12 acquires the processing information and the print data from the cloud server 14 in accordance with the pattern A in the image forming system 10 according to this exemplary embodiment.

When a user moves to the front of the image forming apparatus 12 and operates the user interface 22 to activate the apparatus application 64, the apparatus application 64 requests the cloud server 14 for the list of document names.

The cloud server 14 transmits the list of document names in response to the request for the list of document names from the apparatus application 64.

When the user operates the user interface 22 to select a document name, the apparatus application 64 requests the cloud server 14 for processing information corresponding to the selected document name. In selecting a document name, printing settings may be changed appropriately.

In the cloud server 14, the reception unit 58 receives the request for the processing information from the apparatus application 64, and the processing response unit 60 transmits the processing information corresponding to the document name to the apparatus application 64.

When the user operates the user interface 22 to issue an instruction for starting printing, the apparatus application 64 requests the cloud server 14 for a token. The apparatus application 64 requests the token by using a document ID as a parameter.

In the cloud server 14, the reception unit 58 receives the request for a token using the document ID from the apparatus application 64 as a parameter, and the token processing unit 62 issues a token using the document ID as a parameter and transmits the token to the apparatus application 64.

The apparatus application 64 requests the resident application 54 for acquisition of print data by using the token and the document ID as parameters. At this time, the apparatus application 64 specifies the IP address of the information processing apparatus 16 as part of the processing information and performs communication. In the case where connection is not able to be established using the specified IP address, a process described below is performed.

In the case where an answer indicating absence of the specified document is transmitted from the resident application 54 or a predetermined time has passed, the apparatus application 64 determines that connection with the resident application 54 is unable to be established and requests the cloud server 14 for the print data.

In the cloud server 14, the reception unit 58 receives the request for the print data from the apparatus application 64, and the processing response unit 60 transmits the corresponding print data to the apparatus application 64.

The apparatus application 64 issues a printing instruction to the image formation platform 66. The apparatus application 64 issues the printing instruction by using printing settings and print data as parameters. Accordingly, the image formation platform 66 forms an image based on the printing settings and the print data, and printing is thus performed.

Figure 11:
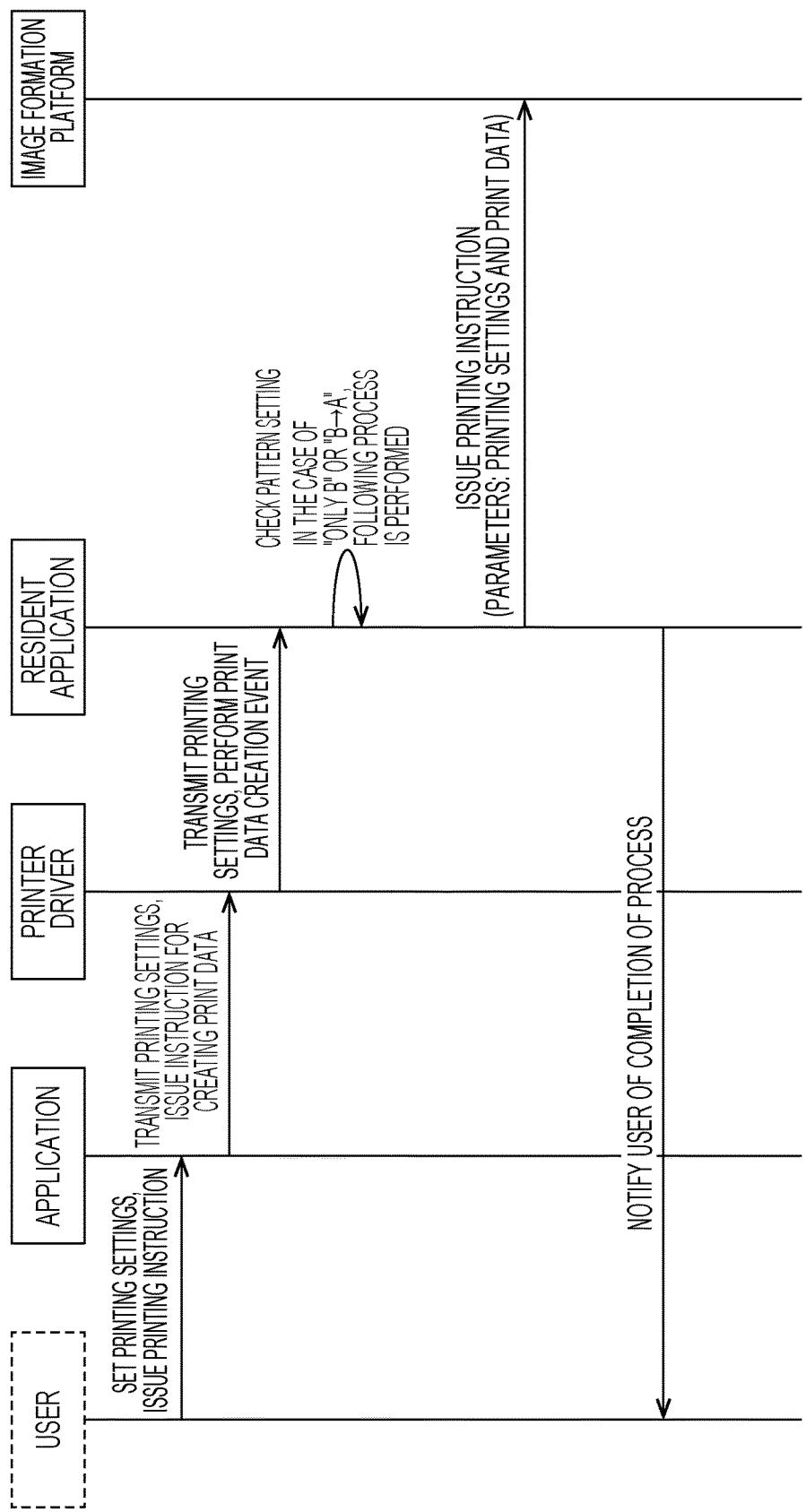
FIG. 11 is a sequence diagram illustrating an example of the procedure of a process for a case where printing is performed in accordance with the pattern B in an image forming system according to an exemplary embodiment.

Next, a case where printing is performed in accordance with the pattern B will be described. FIG. 11 is a sequence diagram illustrating an example of the procedure of a process for a case where printing is performed in accordance with the pattern B in the image forming system 10 according to this exemplary embodiment.

When a user operates the information processing apparatus 16 to set printing settings on the application 50 and issue a printing instruction, the application 50 transmits the set printing settings to the printer driver 52 to issue an instruction for creating print data.

The printer driver 52 transmits the printing settings to the resident application 54 in response to the instruction for creating print data from the application 50, and notifies the resident application 54 of a print data creation event for creating the print data.

The resident application 54 receives the printing settings transmitted from the printer driver 52, and checks a pattern setting set in advance by the user. In the case where a setting is set such that only the pattern B is executed or such that the pattern A is executed if the pattern B is unable to be executed, the resident application 54 performs a process described below.

That is, the resident application 54 issues a printing instruction to the image formation platform 66 of the image forming apparatus 12 by using the printing settings and the print data as parameters. Accordingly, the image formation platform 66 forms an image based on the printing settings and the print data, and printing is thus performed. Then, the resident application 54 notifies the user of completion of the process.

Figure 12:
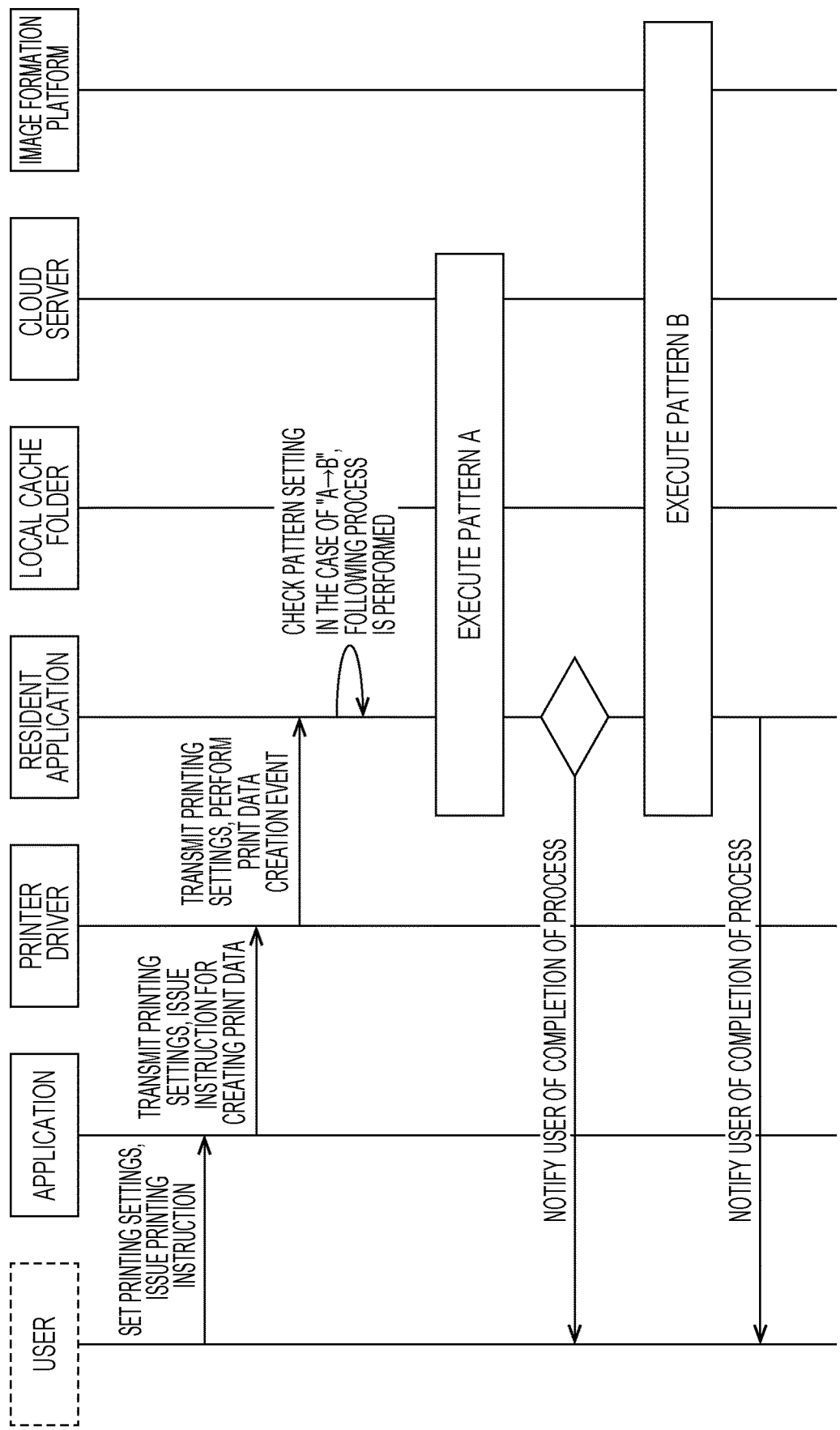
FIG. 12 is a sequence diagram illustrating an example of the procedure of a process for a case where printing is performed in accordance with pattern B if the pattern A fails to be executed in an image forming system according to an exemplary embodiment.

Next, a case where printing is performed in accordance with the pattern B if the pattern A fails to be executed will be described. FIG. 12 is a sequence diagram illustrating an example of the procedure of a process for a case where printing is performed in accordance with the pattern B if the pattern A fails to be executed in the image forming system 10 according to this exemplary embodiment.

When a user operates the information processing apparatus 16 to set printing settings on the application 50 and issue a printing instruction, the application 50 transmits the set printing settings to the printer driver 52 to issue an instruction for creating print data.

The printer driver 52 transmits the printing settings to the resident application 54 in response to the instruction for creating print data from the application 50, and notifies the resident application 54 of a print data creation event for creating the print data.

The resident application 54 receives the printing settings transmitted from the printer driver 52, and checks a pattern setting set in advance by the user. In the case where a setting is set such that the pattern B is executed if the pattern A fails to be executed, the resident application 54 executes the pattern A described above.

Then, the resident application 54 determines whether or not printing based on the pattern A has been successful. In the case where printing based on the pattern A has been successful, the resident application 54 notifies the user of completion of the process.

In contrast, in the case where printing based on the pattern A has failed, printing is performed in accordance with the pattern B described above with reference to FIG. 11. Then, the resident application 54 notifies the user of completion of the process.

In the case where a setting is set such that printing is performed in accordance with the pattern A if the pattern B fails to be executed, the order of execution of the pattern A and execution of the pattern B in FIG. 12 may be inverted.

A process performed in each component of the image forming system 10 according to the foregoing exemplary embodiment may be performed by software, performed by hardware, or performed by a combination of software and hardware. Furthermore, a process performed in each unit of the image forming system 10 may be stored as a program in a storage medium and distributed.

The present disclosure is not limited to the exemplary embodiments described above. Obviously, various changes may be made to the present disclosure without departing from the scope of the present disclosure.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
a processor configured to:
   acquire processing information including access information regarding access to an information processing apparatus and information for forming an image represented by image data from a server;
   acquire the image data directly from the information processing apparatus corresponding to the access information by:
      requesting the server for issuance of a first token using the processing information acquired from the server,
      requesting the information processing apparatus for issuance of a second token using the issued first token and the processing information, and
      requesting the information processing apparatus for the image data by using the issued second token and the processing information; and
   perform control such that image formation is performed using the acquired image data and the acquired processing information.

2. An image forming system comprising:
an information processing apparatus;
an image forming apparatus; and
a server that is able to connect to the information processing apparatus and the image forming apparatus,
wherein the information processing apparatus includes a first processor configured to:
   when receiving an image forming instruction issued to the image forming apparatus, transmit image data and processing information to the server, the processing information including access information regarding access to the information processing apparatus and information for forming an image represented by the image data, and store the image data into the information processing apparatus; and
   perform control for transmitting the image data to the image forming apparatus in response to transmission of the image data being requested from the image forming apparatus,
wherein the image forming apparatus includes a second processor configured to:
   acquire the processing information from the server;
   acquire the image data directly from the information processing apparatus corresponding to the access information by:
      requesting the server for issuance of a first token using the processing information acquired from the server,
      requesting the information processing apparatus for issuance of a second token using the issued first token and the processing information, and
      requesting the information processing apparatus for the image data by using the issued second token and the processing information; and perform control such that image formation is performed using the acquired image data and the acquired processing information, and wherein the first processor is configured to:
request the server for verification of validity of the second token using the first token and the processing information, and
in a case where the second token is valid, transmit the image data stored in the information processing apparatus to the image forming apparatus.

3. The image forming system according to claim 2, wherein the first processor is configured to, after transmitting the processing information to the server, delete all or part of the processing information.

4. The image forming system according to claim 3, wherein the first processor is configured to encrypt the image data and store the encrypted image data into the information processing apparatus.

5. The image forming system according to claim 4, wherein the first processor is configured to delete the image data stored in the information processing apparatus at a time different from a time at which the image data transmitted to the server is deleted.

6. The image forming system according to claim 3, wherein the first processor is configured to delete the image data stored in the information processing apparatus at a time different from a time at which the image data transmitted to the server is deleted.

7. The image forming system according to claim 6, wherein the first processor is configured to delete the image data on the information processing apparatus at a time earlier than the time at which the image data transmitted to the server is deleted.

8. The image forming system according to claim 2, wherein the first processor is configured to encrypt the image data and store the encrypted image data into the information processing apparatus.

9. The image forming system according to claim 8, wherein the first processor is configured to delete the image data stored in the information processing apparatus at a time different from a time at which the image data transmitted to the server is deleted.

10. The image forming system according to claim 2, wherein the first processor is configured to delete the image data stored in the information processing apparatus at a time different from a time at which the image data transmitted to the server is deleted.

11. The image forming system according to claim 10, wherein the first processor is configured to delete the image data on the information processing apparatus at a time earlier than the time at which the image data transmitted to the server is deleted.

12. The image forming system according to claim 10, wherein the first processor is configured to manage deletion of the image data in accordance with a predetermined operation of the information processing apparatus.

13. The image forming system according to claim 2, wherein the first processor is configured to switch between a first pattern and a second pattern,
wherein the first pattern comprises:
transmitting the image data and the processing information to the server;
storing the image data into the information processing apparatus; and
transmitting the image data to the image forming apparatus in response to transmission of the image data being requested from the image forming apparatus,
wherein the second pattern comprises transmitting the image data and the processing information directly to the image forming apparatus.

14. The image forming system according to claim 13, wherein the first processor is configured to:
execute one of the first pattern and the second pattern according to a setting; and
in a case where the execution of the one of the first pattern and the second pattern fails, execute the other one of the first pattern and the second pattern.

15. The image forming system according to claim 14, wherein the first processor is configured to, in a case where the information processing apparatus is not able to connect to the server, execute the second pattern.

16. The image forming system according to claim 14, wherein the first processor is configured to, in a case where the information processing apparatus is not able to connect directly to a predetermined image forming apparatus, execute the first pattern.

* * * * *